US011027421B2

(12) United States Patent
Ohtsubo et al.

(10) Patent No.: US 11,027,421 B2
(45) Date of Patent: Jun. 8, 2021

(54) ROBOT AND ROBOT SYSTEM

(71) Applicant: Kabushiki Kaisha Yaskawa Denki, Kitakyushu (JP)

(72) Inventors: Naoyuki Ohtsubo, Kitakyushu (JP); Tsuyoshi Ito, Kitakyushu (JP); Yuji Ishimaru, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 302 days.

(21) Appl. No.: 16/053,962

(22) Filed: Aug. 3, 2018

(65) Prior Publication Data

US 2019/0054614 A1 Feb. 21, 2019

(30) Foreign Application Priority Data

Aug. 18, 2017 (JP) ............................ JP2017-157941

(51) Int. Cl.

*B25J 9/10* (2006.01)
*F16H 57/027* (2012.01)
*B25J 19/00* (2006.01)
*F16H 57/029* (2012.01)
*F16H 57/04* (2010.01)

(Continued)

(52) U.S. Cl.

CPC .......... *B25J 9/102* (2013.01); *B25J 19/0062* (2013.01); *F16H 57/027* (2013.01); *F16H 57/029* (2013.01); *F16H 57/0454* (2013.01); *B25J 9/0018* (2013.01); *F16H 2057/02073* (2013.01); *F16H 2057/02095* (2013.01)

(58) Field of Classification Search

CPC ...... B25J 9/0018; B25J 9/102; B25J 19/0062; F16H 57/027; F16H 57/029; F16H 57/0454

See application file for complete search history.

(56) References Cited

U.S. PATENT DOCUMENTS 3,826,383 A * 7/1974 Richter .................... B25J 9/046 414/730
4,764,033 A * 8/1988 Kohring .................... B25J 9/14 384/99

(Continued)

FOREIGN PATENT DOCUMENTS

CN 101272886 A 9/2008
CN 103912663 A 7/2014

(Continued)

OTHER PUBLICATIONS

Japanese Office Action dated Dec. 27, 2019 in Japanese Patent Application No. 2017-157941 (With unedited computer generated English translation), 10 pages.

(Continued)

*Primary Examiner* — William C Joyce
(74) *Attorney, Agent, or Firm* — Oblon, McClelland, Maier & Neustadt, L.L.P.

(57) ABSTRACT

A robot is provided which has: a housing including a plurality of joints; a reduction gear placed in the joint, the reduction gear including a lubrication chamber where a gear mechanism for slowing down and transmitting an output of a motor and lubricant is sealed; and an air chamber placed inside the housing, the air chamber communicating with the lubrication chamber.

20 Claims, 11 Drawing Sheets

6a
3b
6
4
23
8a
8b
8
25
5a
5
27
26
22
23
(OTHER SIDE IN AXIAL DIRECTION)
UP
REAR
FRONT
RIGHT
DOWN
(ONE SIDE IN AXIAL DIRECTION)
24a
24
21
4a
21a
AxS

(51) Int. Cl.
*B25J 9/00* (2006.01)
*F16H 57/02* (2012.01)

(56) References Cited

U.S. PATENT DOCUMENTS

| | | | | |
|---|---|---|---|---|
| 5,259,194 | A * | 11/1993 | Okada | B60K 17/14<br>475/83 |
| 5,712,552 | A * | 1/1998 | Hirai | B25J 19/0029<br>318/568.1 |
| 2008/0258402 | A1 * | 10/2008 | Tamura | B25J 19/0075<br>277/345 |
| 2008/0295623 | A1 * | 12/2008 | Kurita | B25J 9/102<br>74/25 |
| 2012/0145075 | A1 | 6/2012 | Takahashi | |
| 2014/0034422 | A1 | 2/2014 | Collmer et al. | |
| 2015/0321344 | A1 * | 11/2015 | Hahakura | B25J 19/023<br>74/490.02 |
| 2017/0028567 | A1 | 2/2017 | Kojima et al. | |
| 2017/0282382 | A1 * | 10/2017 | Inoue | B25J 19/0029 |
| 2017/0335923 | A1 * | 11/2017 | Smith | A01G 25/092 |
| 2017/0341099 | A1 | 11/2017 | Kitamura et al. | |

FOREIGN PATENT DOCUMENTS

| | | | |
|---|---|---|---|
| CN | 203717870 | U | 7/2014 |
| DE | 33 37 059 | * | 5/1984 |
| JP | 60-143688 | * | 9/1985 |
| JP | 7-310808 | A | 11/1995 |
| JP | 2002-13618 | * | 1/2002 |
| JP | 2003-181788 | * | 7/2003 |
| JP | 2006-038019 | A | 2/2006 |
| JP | 2007-232003 | A | 9/2007 |
| JP | 2012-121105 | A | 6/2012 |
| JP | 2014-133276 | * | 7/2014 |
| JP | 2016-107380 | A | 6/2016 |
| JP | 2017-7053 | A | 1/2017 |
| JP | 2017-30138 | A | 2/2017 |

OTHER PUBLICATIONS

Extended European Search Report dated Dec. 21, 2018 in Patent Application No. 18186507.2, 7 pages.

Office Action issued Jan. 29, 2021 in Chinese Patent Application No. 201810540112.4 (with English-language Translation), citing documents AO-AQ therein, 15 pages.

* cited by examiner 1
3
3a
FL
2
3b
6
16
AxL
7
15
AxT
14
AxB
12
13
AxR
11
5
AxS
9
AxU
10
4
3a
FRONT
UP
DOWN
RIGHT
REAR 3b
6
6a
8
5
26
8a
8b
22
23
21
21a
AxS
4a
24a
24
27
5a
25
4
FRONT
UP
(OTHER SIDE IN AXIAL DIRECTION)
DOWN
(ONE SIDE IN AXIAL DIRECTION)
REAR
RIGHT 8
5
26
31
8a
8b
27
AxS
33
21
32
5a
FRONT
UP
DOWN
RIGHT
REAR 5
8
6
FL
41
8d
6d
6b
41
8c
5b
5d
8a
5b
5d
8c
41
6b
5a
41
8d
6d
6a
FRONT
UP
DOWN
REAR
RIGHT 8
8d
8a
8c
RIGHT
FRONT
UP
DOWN
REAR
LEFT 1A
3
3a
2
FL
15
AxT
14
AxB
12
7
16
6
3b
13
AxL
9
AxR
11
10
AxS
5
AxU
4
3a
FRONT
UP
DOWN
RIGHT
REAR 1B
2
3
3a
3b
4
5
6
7
9
10
11
12
13
14
15
16
FL
AxS
AxL
AxU
AxR
AxB
AxT
UP
DOWN
FRONT
REAR
RIGHT

ROBOT AND ROBOT SYSTEM

CROSS-REFERENCE TO RELATED APPLICATION

This application claims priority from Japanese Patent Application No. 2017-157941 filed with the Japan Patent Office on Aug. 18, 2017, the entire content of which is hereby incorporated by reference.

BACKGROUND

1. Field of the Invention

The present disclosure relates to a robot and a robot system.

2. Description of the Related Art

A reduction gear with an air vent hole is described in JP-A-2006-38019. The reduction gear includes a casing provided with a gear mechanism for slowing down and transmitting torque of an input unit to an output unit, the casing forming an internal volume portion in which lubricant is sealed, and a cylindrical body portion in which another space volume portion communicating with the internal volume portion is formed. The cylindrical body portion is placed in such a manner that the other space volume portion is located above the upper surface of the lubricant in the internal volume portion in the vertical direction. Moreover, the cylindrical body portion is provided with an air vent hole.

SUMMARY

In order to solve the above problem, one aspect of the present disclosure provides a robot having a housing including a plurality of joints, a reduction gear placed in the joint, the reduction gear housing a gear mechanism for slowing down and transmitting an output of a motor, the reduction gear including a lubrication chamber sealed to hold lubricant, and an air chamber placed inside the housing, the air chamber communicating with the lubrication chamber.

Moreover, according to another aspect of the embodiment, a robot system is provided which includes the robot, and a work booth for the robot to perform predetermined work.

According to the embodiment, it is possible to reduce the leak of the lubricant of the reduction gear irrespective of contact or collision with an external object.

DESCRIPTION OF THE EMBODIMENTS

Figure 1:
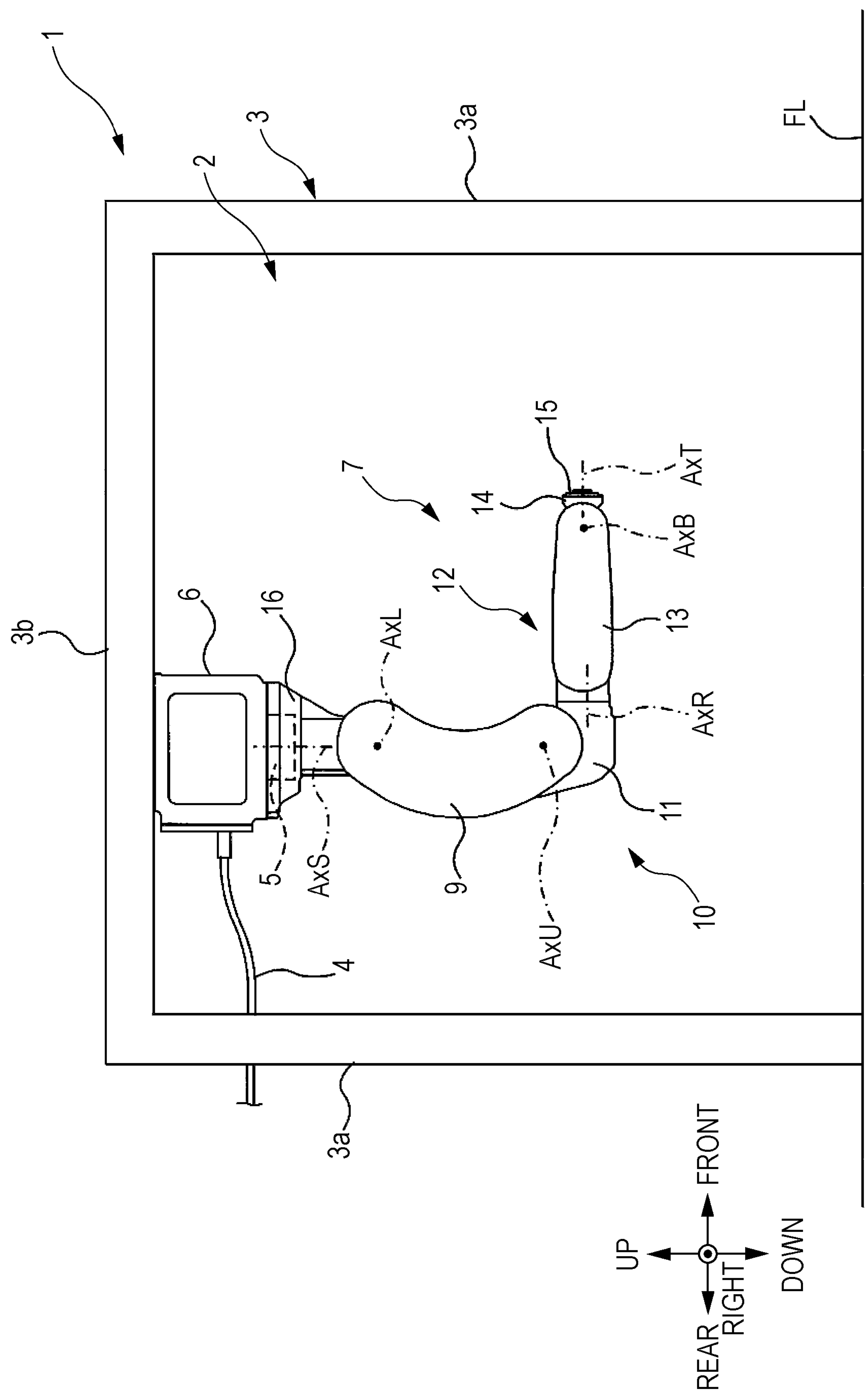
FIG. 1 is an explanatory view depicting an example of the entire configuration of a robot system where a robot is mounted on a ceiling wall of a paint booth.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment is described hereinafter with reference to the drawings. In the following description, terms indicating directions such as up, down, left, right, front, and rear may be used as appropriate for convenience of description of the configurations of a robot and the like. However, the use of these terms does not restrict the positional relationship of configurations of the robot and the like.

<1. Entire Configuration of Robot System>

An example of the entire configuration of a robot system 1 according to the embodiment is described with reference to FIG. 1. The robot system 1 of the example of the embodiment is a painting robot system used for painting work.

As illustrated in FIG. 1, the robot system 1 includes a paint booth 2 (an example of a work booth), and a robot 10 placed in the paint booth 2. A feed cable 4 that feeds electric power is connected to the robot 10. The paint booth 2 is surrounded by a box-shaped protective wall 3 mounted on a floor surface FL. The protective wall 3 includes a plurality of side walls 3*a* standing on the floor surface FL and a ceiling wall 3*b* provided at the upper end of the side walls 3*a*.

The robot 10 includes a base 6 and an arm 7 having six moving portions. In this example, the robot 10 is configured as a six-axis vertical articulated single arm robot. In the illustrated example, the robot 10 is mounted in what is called a ceiling-hung state where the base 6 is fixed to the ceiling wall 3*b* (an example of a ceiling surface). The base 6 may be mounted on, for example, the floor surface FL or the side wall 3*a* (an example of a wall surface) of the paint booth 2, other than the ceiling wall 3*b* (refer to FIGS. 8 and 10 described below). Alternatively, the base 6 may be mounted on another stand and the like different from the protective wall 3.

The arm 7 is coupled to the base 6 in such a manner as to be turnable around an S-axis AxS (an example of the axis of rotation) being an axis in the vertical direction. In the specification, an end, on the base 6 side, of each moving portion of the arm 7 is defined as the "base end" of the moving portion, and an end opposite to the base 6 is defined as the "tip" of the moving portion. The arm 7 includes a rotating head 16, a lower arm 9, an upper arm 11, and a wrist 12 having three moving portions.

The rotating head 16 is supported by the base 6 in such a manner as to be turnable around the S-axis AxS. The driving force of an S-axis motor 24 (refer to FIG. 2 described below) provided near a joint with the base 6 is transmitted to the rotating head 16 via a reduction gear 5 placed in the joint. Consequently, the rotating head 16 turns around the S-axis AxS with respect to the base 6.

The lower arm 9 is supported by a tip portion of the rotating head 16 in such a manner as to be rotatable about an L-axis AxL being the axis of rotation orthogonal to the S-axis AxS. The lower arm 9 rotates about the L-axis AxL with respect to the tip portion of the rotating head 16 with the drive of an L-axis motor 28 (refer to FIG. 2 described below) provided near a joint with the rotating head 16.

The upper arm 11 is supported by a tip portion of the lower arm 9 in such a manner as to be rotatable about a U-axis AxU being the axis of rotation parallel to the L-axis AxL. The upper arm 11 rotates about the U-axis AxU with respect to the tip portion of the lower arm 9 with the drive of a motor (not illustrated) provided near a joint with the lower arm 9.

The wrist 12 is coupled to a tip portion of the upper arm 11. The wrist 12 includes a first wrist moving portion 13, a second wrist moving portion 14, and a third wrist moving portion 15.

The first wrist moving portion 13 is supported by the tip portion of the upper arm 11 in such a manner as to be rotatable about an R-axis AxR being the axis of rotation orthogonal to the U-axis AxU. The first wrist moving portion 13 can rotate about the R-axis AxR with respect to the tip portion of the upper arm 11 with the drive of a motor (not illustrated) placed near a joint with the upper arm 11.

The second wrist moving portion 14 is supported by a tip portion of the first wrist moving portion 13 in such a manner as to be rotatable about a B-axis AxB being the axis of rotation orthogonal to the R-axis AxR. The second wrist moving portion 14 rotates about the B-axis AxB with respect to the tip portion of the first wrist moving portion 13 with the drive of a motor (not illustrated) placed in the first wrist moving portion 13.

The third wrist moving portion 15 is supported by a tip portion of the second wrist moving portion 14 in such a manner as to be rotatable about a T-axis AxT being the axis of rotation orthogonal to the B-axis AxB. The third wrist moving portion 15 rotates about the T-axis AxT with respect to the tip portion of the second wrist moving portion 14 with the drive of a motor (not illustrated) placed in the first wrist moving portion 13. An end effector (not illustrated) is attached to the tip of the third wrist moving portion 15.

The robot 10 can be used for various applications such as painting, handling, and welding according to the types of end effectors to be attached to the wrist 12. In the embodiment, an unillustrated spray gun is attached as the end effector to the tip of the wrist 12. The robot 10 is used for paint applications. A paint target object may be a large target object such as a vehicle body, or a target object having a small housing such as a mobile phone.

The base 6 as a whole is formed in a substantially cuboid shape. The reduction gear 5 is fixed to the base 6. The reduction gear 5 as a whole is formed in a substantially cylindrical shape. The feed cable 4 connects an unillustrated robot controller and the like placed outside the paint booth 2, and the base 6. In the example of the embodiment, a description is given, assuming that a side where the feed cable 4 is arranged extending from the base 6 is the rear side (the left side in FIG. 1), the opposite side thereof is the front side (the right side in FIG. 1), the front side with respect to the paper surface is the right side, and the back side with respect to the paper surface is the left side.

Moreover, the configuration of the above-described robot 10 is an example. The robot 10 may have a configuration other than the above one. For example, the directions of the axes of rotation of the moving portions of the arm 7 are not limited to the above directions, and may be other directions. Moreover, the numbers of the moving portions of the wrist 12 and the arm 7 are not limited to three and six, respectively, and may be other numbers. Moreover, the robot 10 is not limited to a single arm robot having only one arm 7, and may be a multi-arm robot having a plurality of the arms 7. Moreover, the robot 10 is not limited to the vertical articulated robot, and may be another type of a robot such as a horizontal articulated type.

<2. Internal Configuration of Base and Reduction Gear>

Figure 2:
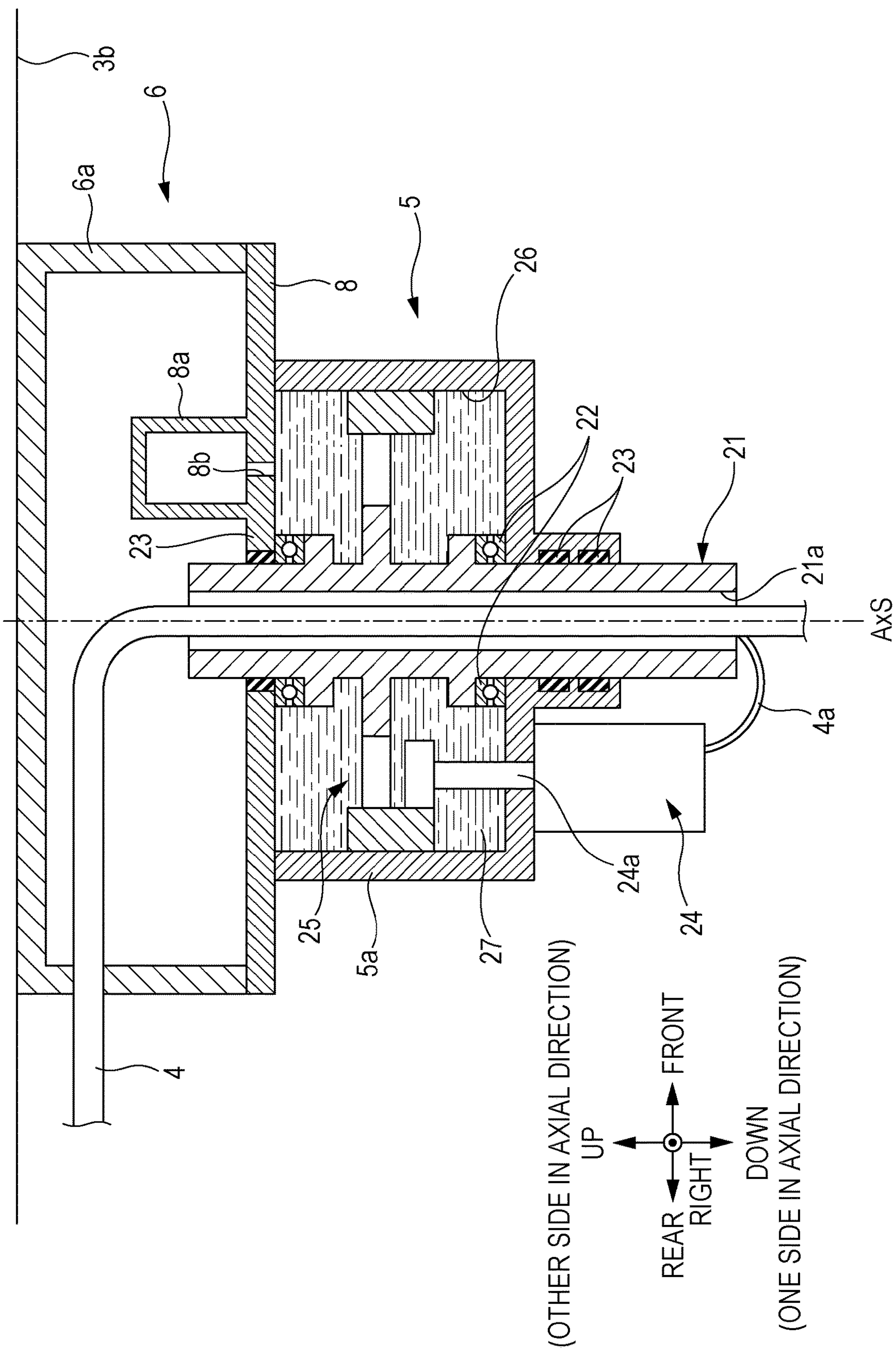
FIG. 2 is a cross-sectional view illustrating an example of the internal peripheral structure of a base and a reduction gear along an axial direction of an S-axis.

FIG. 2 illustrates an example of the internal peripheral structure of the base 6 and the reduction gear 5 in cross section along the axial direction of the S-axis AxS. The illustration of the rotating head 16 is omitted. In FIG. 2, an outer frame of the base 6 and the reduction gear 5 includes a base casing **6*a*, a flange member 8, and a reduction gear casing 5*a***.

The base casing **6*a* is formed in a hollow substantially cuboid shape. A side opposite to the ceiling wall 3*b* being the mount surface in this case (the lower side in FIG. 2; hereinafter referred to as the one side in the axial direction) is open in a substantially circular shape. The flange member 8 is formed in a substantially disk shape. The flange member 8 is fixed in such a manner as to cover the circular opening of the base casing 6*a* from the one side in the axial direction (the lower side in FIG. 2). The reduction gear casing 5*a* has a smaller diameter than that of the flange member 8, and is formed in a hollow substantially cylindrical shape. A circular opening at an end, on the other side in the axial direction (the upper side in FIG. 2), of the reduction gear casing 5*a* is fixed to a surface, on the one side in the axial direction (the lower side in FIG. 2), of the flange member 8** while being coaxially placed.

An output shaft 21 of the reduction gear 5 including a hollow portion **21*a* penetrates the center of the reduction gear casing 5*a* and the flange member 8. The output shaft 21 is supported via a bearing 22 inside the reduction gear casing 5*a* in such a manner as to be rotatable about the S-axis AxS. One side of the output shaft 21 in the axial direction is fixed (the lower side in FIG. 2) to a rotating head casing (illustration omitted) being an outer frame of the rotating head 16. Moreover, sliding contact portions of the reduction gear casing 5*a* and the flange member 8 with respect to the output shaft 21 are provided with oil seals 23, respectively. The S-axis motor 24 is provided on the one side in the axial direction (the lower side in FIG. 2) of the reduction gear casing 5*a* in the rotating head 16. The rotational output of an output shaft 24*a* of the S-axis motor 24 is reduced via an appropriate gear mechanism 25 housed in the reduction gear casing 5*a*, and transmitted to the output shaft 21 of the reduction gear 5**.

In the reduction gear 5 with the above configuration, an internal space of the reduction gear casing **5*a* enclosed by the flange member 8 forms a lubrication chamber 26. The above described lubrication chamber 26 is sealed to hold lubricant 27 (refer to a shaded part in FIG. 2) such as grease or oil. Consequently, the above described gear mechanism 25 is in a state of being immersed in the lubricant 27. The configuration of lubrication and drainage of the lubricant 27 in the lubrication chamber 26 is described in detail in FIG. 3** below.

Moreover, an air chamber 8*a* having a substantially columnar shape as a whole and a hollow internal structure is integrally formed with the flange member 8 and placed inside the base casing 6*a*. The inside of the air chamber 8*a* communicates with the above described lubrication chamber 26 through a communicating hole 8*b* penetrating the flange member 8.

The feed cable 4 is introduced from the above described arm 7 into the base 6, penetrating the hollow portion 21*a* of the output shaft 21. The feed cable 4 is pulled toward one side (the rear side in FIG. 2), in a direction perpendicular to the S-axis AxS (the horizontal direction in FIG. 2), with respect to the S-axis AxS in such a manner as to lead to the outside of the base 6. On the other hand, the air chamber 8*a* is placed on the other side (the front side in FIG. 2), in the direction perpendicular to the S-axis AxS, with respect to the S-axis AxS in the base 6. The S-axis motor 24 is connected to its corresponding feed cable 4*a* included in the feed cable 4. Moreover, another unillustrated joint axis motor and the unillustrated end effector are also connected to their corresponding feed cables included in the feed cable 4.

The configurations of the gear mechanism 25 in the reduction gear 5, the output shaft 21, and the like, which are described above, are examples. These reduction gear 5 and gear mechanism 25 may have configurations other than the above ones. Moreover, the base casing 6*a* and casings of the moving portions configuring the arm 7 (for example, a rotating head casing) correspond to a housing used in the embodiment.

<3. Lubrication and Drainage Configuration of Lubrication Chamber>

Figure 3:
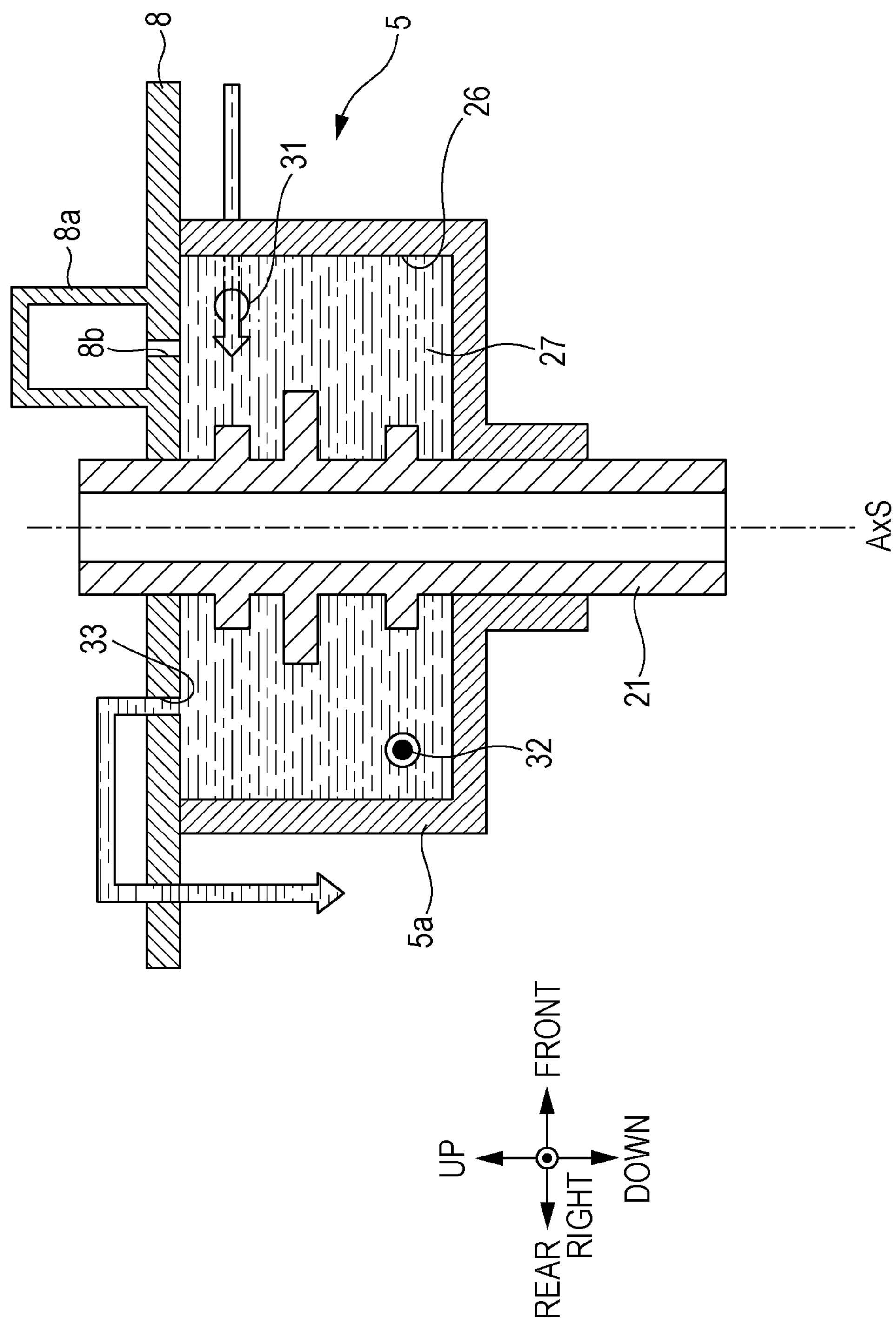
FIG. 3 is a cross-sectional view illustrating an example of the configuration of lubrication and drainage of lubricant in a lubrication chamber along the axial direction of the S-axis.

FIG. 3 illustrates an example of the configuration of lubrication and drainage of the lubricant 27 in the lubrication chamber 26 in cross section along the axial direction of the S-axis AxS. In an example illustrated in FIG. 3, one lubrication port 31 (an example of an inlet) and two drain ports 32 and 33 (examples of an outlet) are provided to the lubrication chamber 26 (illustration omitted in FIG. 2). The lubrication port 31 is a valve provided in such a manner that the lubricant 27 can be poured into the lubrication chamber 26 (into the reduction gear casing 5*a*) from outside. In the example illustrated in FIG. 3, the lubrication port 31 is located on the flange member 8 side in the axial direction of the S-axis AxS (the other side in the axial direction) and on the air chamber 8*a* side in a direction orthogonal to the S-axis AxS (the horizontal direction in FIG. 3), on a circumferential side surface of the reduction gear casing 5*a*.

The drain ports 32 and 33 are valves provided in such a manner that the lubricant 27 can be drained from inside the lubrication chamber 26 (inside the reduction gear casing 5*a*) to the outside. In the example illustrated in FIG. 3, the side surface drain port 32 and the end face drain port 33 are provided. The side surface drain port 32 is located on the arm 7 side in the axial direction of the S-axis AxS (the one side in the axial direction) and on a side opposite to the lubrication port 31 in the direction orthogonal to the S-axis AxS (the horizontal direction in FIG. 3), on the circumferential side surface of the reduction gear casing 5*a*. The end face drain port 33 is formed on the flange member 8, and communicates with the outside of the base casing 6*a*.

The lubrication port 31 is a valve specialized in the function of pouring the lubricant 27. Each drain port is a valve specialized in the function of draining the lubricant 27; accordingly, there is no interchangeability between them. Moreover, each of the ports 31, 32, and 33 is switched between a state capable of lubrication and drainage and a sealed closed state.

If the robot 10 is mounted in the ceiling-hung state as illustrated in FIG. 1, such a lubrication and drainage process as illustrated in FIG. 3 is performed: in other words, the side surface drain port 32 is put in the sealed closed state, and the lubricant 27 is poured in through the lubrication port 31. At this point in time, the lubricant 27 is not drained from the side surface drain port 32 located at the lower position in the ceiling-hung state. Hence, the lubricant 27 is gradually stored in the lubrication chamber 26. After the water level rises and reaches the upper flange member 81, a surplus of the lubricant 27 is drained through the end face drain port 33. The lubricant 27 hardly enters the air chamber 8*a* located above the maximum water level. Consequently, even if the amount of the lubricant 27 remaining in the lubrication chamber 26 in a state before pouring is unknown, the lubricant 27 continues to be poured in until being drained through the end face drain port 33, and accordingly can be filled in the lubrication chamber 26. Moreover, an air layer can be ensured in the air chamber 8*a* communicating with the lubrication chamber 26. In this state, the lubrication port 31 and the end face drain port 33 enter the sealed closed state. Consequently, the lubrication work is completed. It is preferable that the internal volume of the air chamber 8*a* ensure an air layer of, for example, approximately 12% or greater of a total internal volume including the air chamber 8*a*, the communicating hole 8*b*, and the lubrication chamber 26.

<4. Assembly Configuration of Base and Reduction Gear>

Furthermore, the structures of the base 6 and the reduction gear 5 of the embodiment illustrated in FIG. 2 are also suitable from the viewpoints of a reduction in the S-axis AxS direction and the ease of assembly of the entire configuration of a combination of the base 6 and the reduction gear 5, the viewpoints being different from the above-mentioned viewpoint of the lubrication and drainage function. These points are described in detail below.

Figure 4:
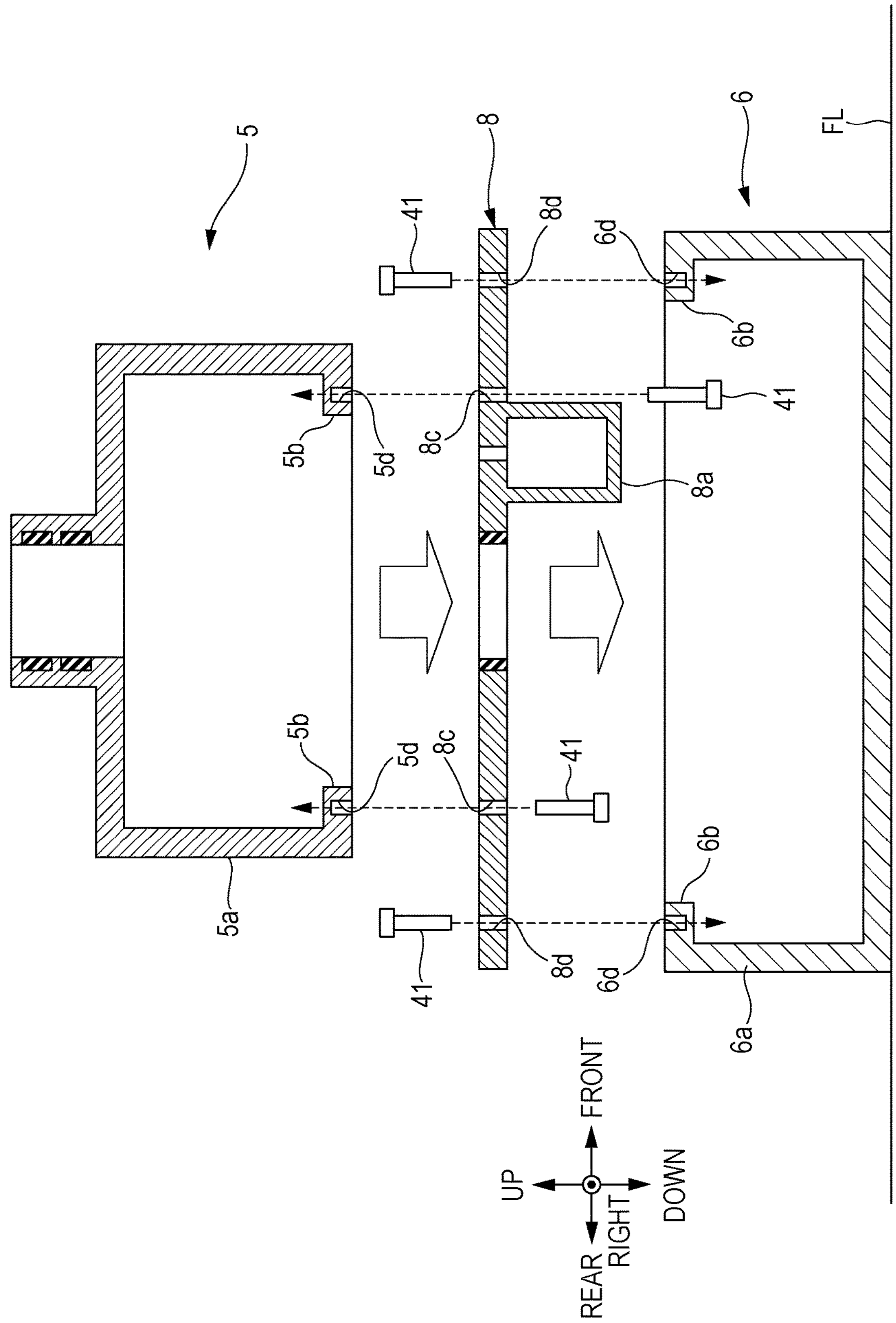
FIG. 4 is a cross-sectional view illustrating an exploded state of a base casing, a flange member, and a reduction gear casing along the axial direction of the S-axis.
Figure 5:
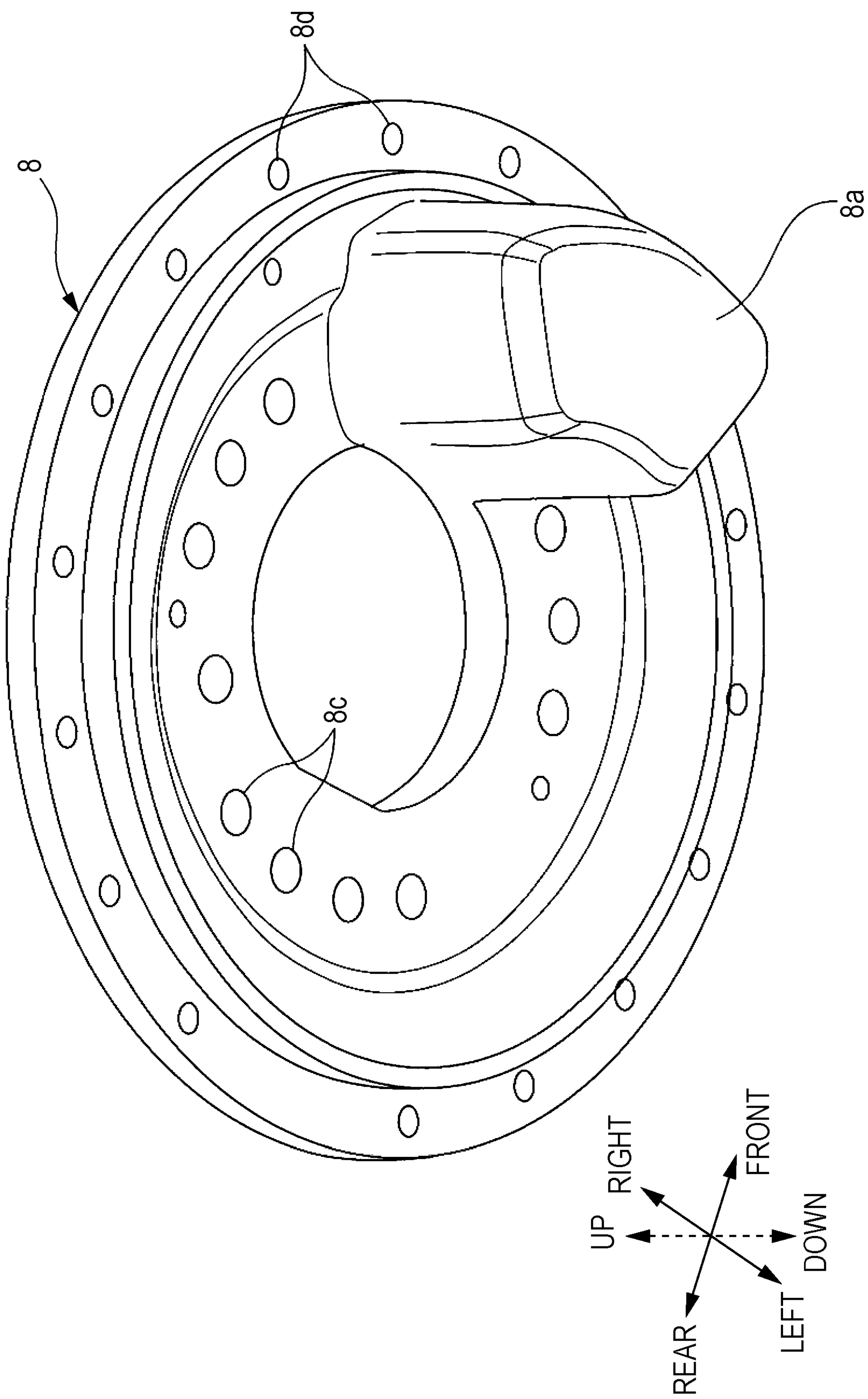
FIG. 5 is a perspective view illustrating an example of the appearance of the flange member.

FIG. 4 illustrates an example of the exploded state of the base casing 6*a*, the flange member 8, and the reduction gear casing 5*a* in cross section along the axial direction of the S-axis AxS. FIG. 5 illustrates an example of the appearance of the flange member 8 in perspective view. When the work of assembling the robot 10 is performed, the robot 10 is assembled in a placement where the robot 10 is mounted on the floor surface FL, that is, in such a manner as to place the flange member 8 and the reduction gear 5 in an overlapping manner on top of the base 6 mounted on the floor surface FL. Hence, FIGS. 4 and 5 correspond to the placement state.

In FIG. 4, an opening edge 5*b* having a smaller diameter than the inner diameter of the reduction gear casing 5*a* is formed on the opening of the reduction gear casing 5*a*. Bolts 41 are screwed into screw holes 5*d* in the opening edge 5*b* through through-holes 8*c* from the one side in the axial direction (the lower side in FIG. 4) of the flange member 8 in a state where the reduction gear casing 5*a* and the flange member 8 are in contact with each other to fix the reduction gear casing 5*a* and the flange member 8 to each other. Moreover, on the other hand, an opening edge 6*b* having a smaller diameter than the inner diameter of the base casing 6*a* (a larger diameter than the outer diameter of the reduction gear casing 5*a*) is also formed on the opening of the base casing 6*a*. The bolts 41 are screwed into screw holes 6*d* in the opening edge 6*b* through through-holes 8*d* from the other end side in the axial direction (the upper side in FIG. 4) of the flange member 8 in a state where the base casing 6*a* and the flange member 8 are in contact with each other to fix the base casing 6*a* and the flange member 8 to each other.

The above assembly process makes the reduction gear casing 5*a* and the base casing 6*a* strongly coupled and fixed in a state of sandwiching the flange member 8 between the reduction gear casing 5*a* and the base casing 6*a*. In the flange member 8 in the example illustrated in FIG. 5, the air chamber 8*a* is integrally formed (for example, cast forming) with a main body of the flange member 8 in a substantially fan-like columnar shape. The internal space of the air chamber 8*a* communicates with the communicating hole 8*b* that is open on the back surface side, with respect to the paper surface in FIG. 5, of the flange member 8 (especially not illustrated). The air chamber 8*a* and the flange member 8 may be coupled as separate components with bolts and the like. The shape of the entire air chamber 8*a* is not limited to the above shape. The entire air chamber 8*a* may be formed in a substantially cylindrical shape, substantially rectangular shape or the like.

In contrast to the above assembly configuration of the embodiment with the flange member 8, an assembly process of a base 6A and a reduction gear 5A of a case without the flange member 8 is described below as a comparative example with reference to FIGS. 6A and 6B.

Figure 6A:
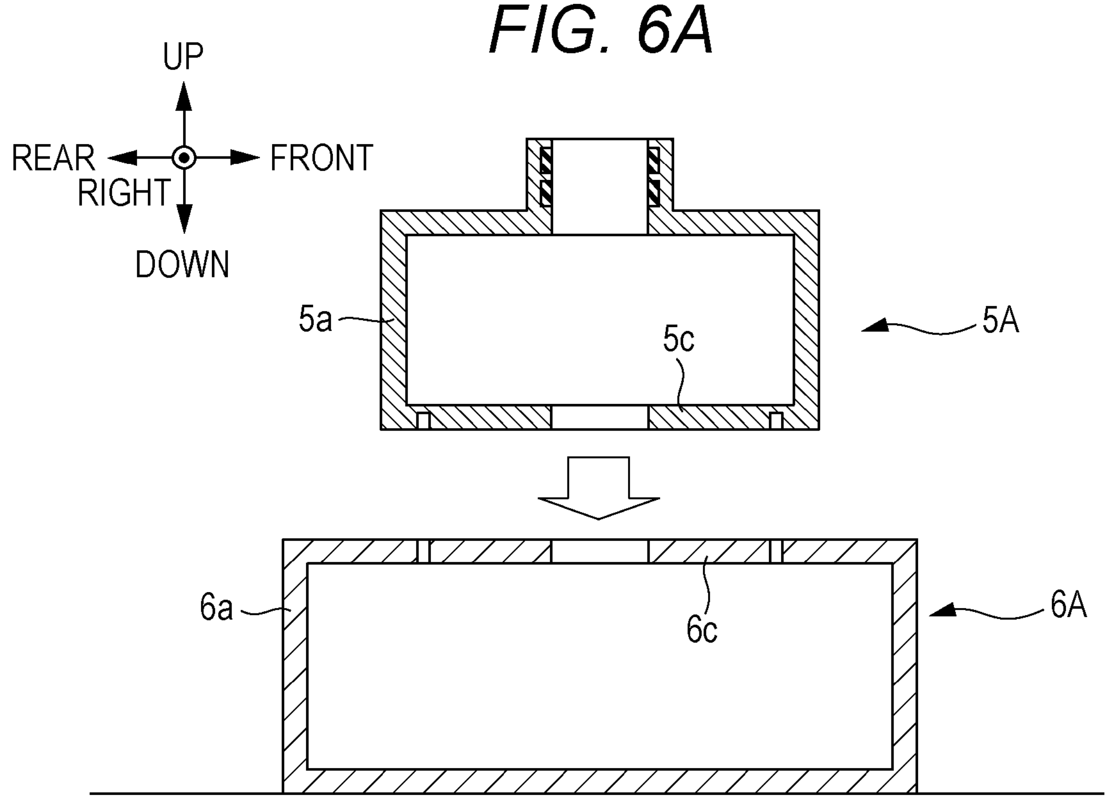
FIGS. 6A and 6B are diagrams illustrating an example of an assembly process of the base and the reduction gear in a case of a comparative example without the flange member.
Figure 6B:
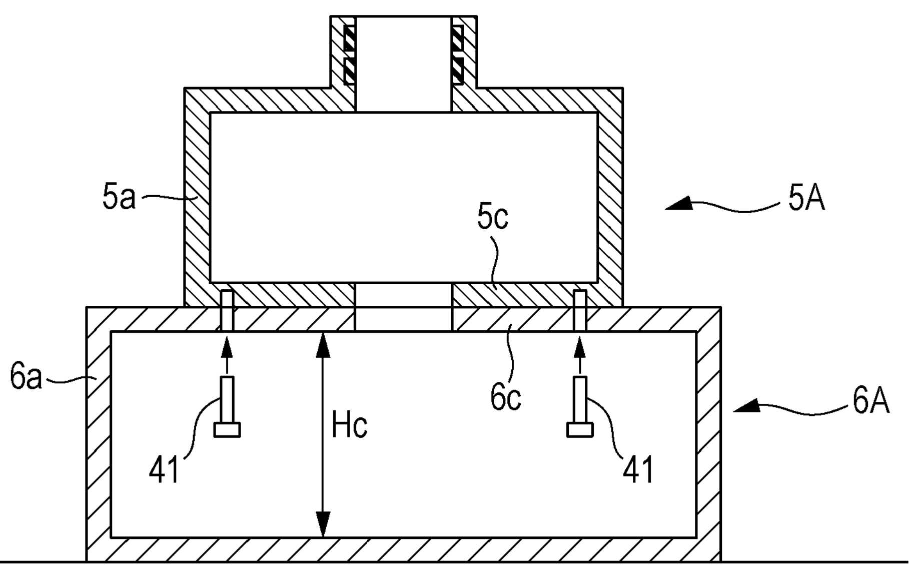

In FIGS. 6A and 6B, the reduction gear casing 5*a* has an undersurface 5*c*. On the other hand, the base casing 6*a* has an upper surface 6*c* (refer to FIG. 6A). The bolts 41 are screwed in while the undersurface 5*c* and the upper surface 6*c* are in contact with each other to fix the undersurface 5*c* and the upper surface 6*c* to each other (refer to FIG. 6B). In the fastening operation, the bolt 41 is inserted upward from inside the base casing 6*a*. Hence, a large work space needs to be ensured in the internal space of the base casing 6*a* in such a manner as to permit the fastening operation of the bolt 41 with a large tool. Hence, a reduction in a dimension Hc in the S-axis AxS direction in the internal space of the base casing 6*a* becomes commensurately difficult. In addition, the assembly work is also complicated.

Figure 7A:
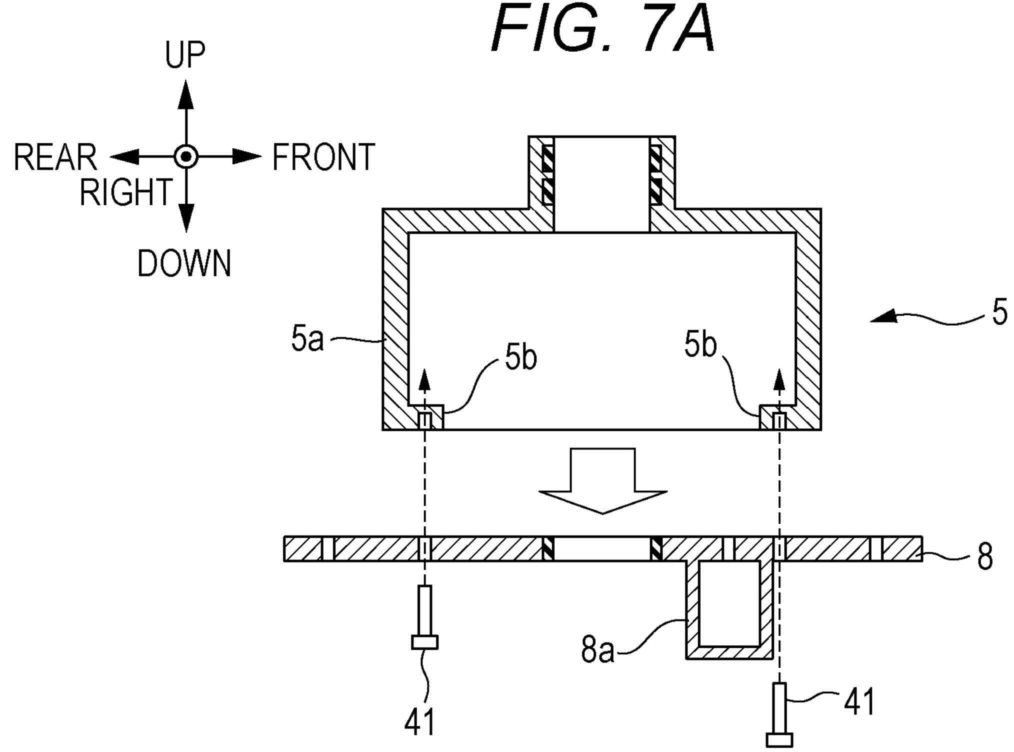
FIGS. 7A and 7B are diagrams illustrating an example of the assembly process of the base and the reduction gear in a case of an embodiment with the flange member.

In contrast, in the case of the embodiment, the flange member 8 and the opening of the reduction gear casing 5*a* are first brought into contact with each other to fasten them with the bolts 41 as illustrated in FIG. 7A. In the fastening operation, the bolts 41 are inserted from the outer end face of the flange member 8 toward the opening edge 5*b* of the reduction gear casing 5*a*. Hence, there are no interfering members and members restricting the work operation in the vicinity. Hence, the assembly work is easy.

Figure 7B:
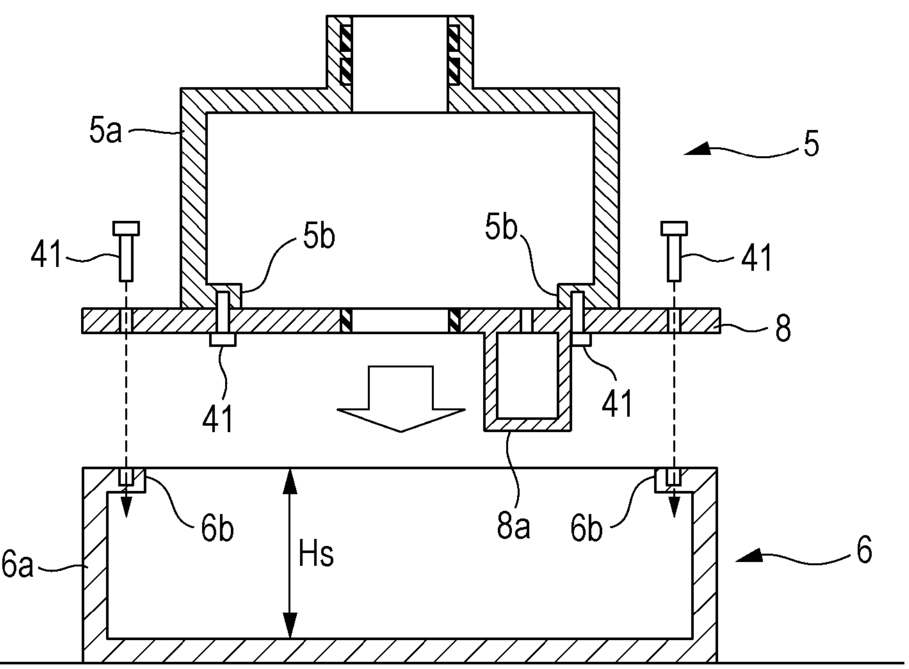

Next, as illustrated in FIG. 7B, the flange member 8 to which the reduction gear 5 is fixed and the opening of the base casing 6*a* are fastened with the bolts 41 while being in contact with each other. In the fastening operation, the bolts 41 are inserted from the outer end face of the flange member 8 (the outer peripheral side of the reduction gear casing 5*a*) toward the opening edge 6*b* of the base casing 6*a*. In this case, the fastening work can be performed from above, and also there are no interfering members and members restricting the work operation, except the reduction gear casing 5*a*, in the vicinity. Hence, the assembly work is relatively easy. The necessity of work in the base casing 6*a* is eliminated. Hence, the necessity of ensuring the work space is eliminated. As a result, a dimension Hs of the base casing 6*a* in the S-axis AxS direction can be reduced.

The above points make the assembly configuration of the base 6, the flange member 8, and the reduction gear 5 of the embodiment illustrated in FIG. 4 suitable in terms of a reduction in the S-axis AxS direction and the ease of assembly of the entire configuration of the combination of the base unit 6 and the reduction gear 5.

<5. Effects of Embodiment>

As described above, the robot 10 of the embodiment includes the housing having the plurality of joints, the reduction gear 5 having the lubrication chamber 26, and the air chamber 8*a*. The lubrication chamber 26 is placed in the joint between the base 6 and the rotating head 16. Moreover, the gear mechanism 25 for slowing down and transmitting the output of the S-axis motor 24 is housed in the lubrication chamber 26, and also the lubrication chamber 26 is sealed to hold the lubricant 27. The air chamber 8*a* is placed inside the base casing 6*a* and communicates with the lubrication chamber 26.

Here, when the temperature inside the lubrication chamber 26 of the reduction gear 5 rises with the operation of the robot 10, the volume of the lubricant 27 increases due to thermal expansion. If the lubrication chamber 26 does not include, therein, an air layer of an appropriate volume at this point in time, the lubricant 27 may leak from the oil seal 23 due to an increase in the internal pressure of the lubrication chamber 26.

According to the embodiment, the air chamber 8*a* communicates with the lubrication chamber 26. Hence, the lubrication chamber 26 can ensure an air layer of an approximate volume. Consequently, even if the volume of the lubricant 27 increases due to thermal expansion, an increase in the internal pressure of the lubrication chamber 26 can be reduced using the air chamber 8*a* as a buffer chamber. Hence, the leak of the lubricant 27 can be prevented. At this point in time, the air chamber 8*a* is placed inside the base casing 6*a*. Hence, the leak of the lubricant 27 of the reduction gear 5 can be reduced irrespective of contact or collision between the robot 10 and an external object.

Moreover, especially in the embodiment, the robot 10 further includes the base 6, and the arm 7 that turns around the S-axis AxS being the axis of rotation of the reduction gear 5 with respect to the base 6. The reduction gear 5 is placed in the joint between the base 6 and the arm 7. The air chamber 8*a* is placed inside the base 6.

Here, the S-axis AxS of the reduction gear 5 placed between the base 6 and the arm 7 extends in the vertical direction when the robot 10 is placed on the floor surface FL. On the other hand, the other reduction gears (not illustrated), that is, the axes of rotation (such as the L-axis AxL, the U-axis AxU, the R-axis AxR, the B-axis AxB, and the T-axis AxT) of the reduction gears placed between the moving portions of the arm 7, extend in the horizontal direction. Hence, in terms of the reduction gear having an axis other than the S-axis AxS, even if the robot 10 is mounted on any one of the floor surface FL, the side wall 3*a*, or the ceiling wall 3*b*, a lubrication port and drain ports for the lubricant 27 are provided in appropriate positions in a circumferential direction around the axis of rotation to enable the formation of an air layer of an appropriate volume in the internal space of the lubrication chamber. On the other hand, in terms of the reduction gear 5 having the S-axis AxS, if the robot 10 is mounted on the floor surface FL or the side wall 3*a*, the lubrication port 31 and the drain ports 32 and 33 enable the formation of an air layer of an appropriate volume (refer to FIGS. 9 and 11 described below). However, if the robot 10 is mounted on the ceiling wall 3*b*, the lubrication chamber 26 is fixed to the lower side of the base casing 6*a*. Accordingly, even the lubrication port 31 and the drain ports 32 and 33 may not enable the formation of an air layer of an appropriate volume.

In the embodiment, the air chamber 8*a* communicating with the lubrication chamber 26 of the reduction gear 5 is placed inside the base casing 6*a*. Consequently, even if the robot 10 is mounted on the ceiling wall 3*b*, the lubrication chamber 26 can ensure an air layer of an appropriate volume. Therefore, also if the robot 10 is mounted and operated on the ceiling wall 3*b*, the leak of the lubricant 27 of the reduction gear 5 can be reduced Moreover, especially in the embodiment, the robot 10 further includes the feed cable 4 introduced into the base casing 6*a* penetrating through the hollow portion 21*a* of the reduction gear 5 and pulled toward the rear in the horizontal direction. The air chamber 8*a* is placed on the front side in the horizontal direction inside the base casing 6*a*.

In the embodiment, the feed cable 4 is pulled toward the rear in the S-axis AxS direction inside the base casing 6*a*. In addition, the air chamber 8*a* is placed on the front side opposite to the routing direction of the feed cable 4. Consequently, it is possible to make the effective use of the internal space of the base 6.

Moreover, in the embodiment, especially the robot 10 further includes the flange member 8 having the lower side fixed to the reduction gear 5, and the upper side fixed to the base casing 6*a*, the flange member 8 having a larger radial dimension with the rotation S-axis AxS as the center than that of the reduction gear 5. The air chamber 8*a* is provided on the upper surface of the flange member 8.

For example, if the reduction gear 5 is fixed directly to the base casing 6*a*, the bolts 41 are inserted and fixed from inside the base casing 6*a* toward the reduction gear 5 as illustrated in the comparative example of FIG. 6. Hence, the fastening work of the bolts 41 is performed in the base casing 6*a*. Hence, work efficiency is reduced. In addition, there is a need to ensure the work space in the base casing 6*a*. As a result, a reduction in the thickness of the entire base 6 is limited.

In the embodiment, the reduction gear 5 is fixed to the base casing 6*a* via the flange member 8. The reduction gear 5 is attached in advance to the flange member 8 to enable the insertion of the bolts 41 from above into a portion, which protrudes from the reduction gear 5, of the flange member 8. Consequently, the reduction gear 5 can be fixed to the base casing 6*a*. Consequently, it is simply required to perform the fastening work of the bolts 41 from above the flange member 8. Accordingly, work efficiency can be dramatically improved. In addition, the necessity of ensuring the work space in the base casing 6*a* is eliminated. Hence, the base 6 can be reduced in thickness.

Moreover, in the embodiment, especially the air chamber 8*a* is integrally formed with the flange member 8. Consequently, the number of components can be reduced as compared to a case where the flange member 8 and the air chamber 8*a* are manufactured as separated components. In addition, the necessity of assembling both components is also eliminated upon manufacturing. Accordingly, the number of man-hours for manufacturing can also be reduced. As a result, the cost can be reduced.

Moreover, in the embodiment, especially the robot system 1 includes the robot 10 and the paint booth 2 as the work booth where the robot 10 performs predetermined work.

According to the embodiment, even if the robot 10 is mounted not only on the floor surface FL or side wall 3*a* but also the ceiling wall 3*b* of the paint booth 2, the robot 10 can be operated. Hence, it is possible to make the effective use of space in the paint booth 2. Therefore, the embodiment is suitable for a robot system that performs work in a predetermined limited area, for example, a robot system that performs painting work in the paint booth 2 being an explosion-proof area.

<6. Other Mount Examples of Robot>

In the robot system 1 of the embodiment, the robot 10 is mounted on the ceiling wall 3*b*. However, a place where the robot 10 is mounted may be other than the ceiling wall 3*b*.

<6-1. Case Where Robot is Mounted on Floor Surface>

Figure 8:
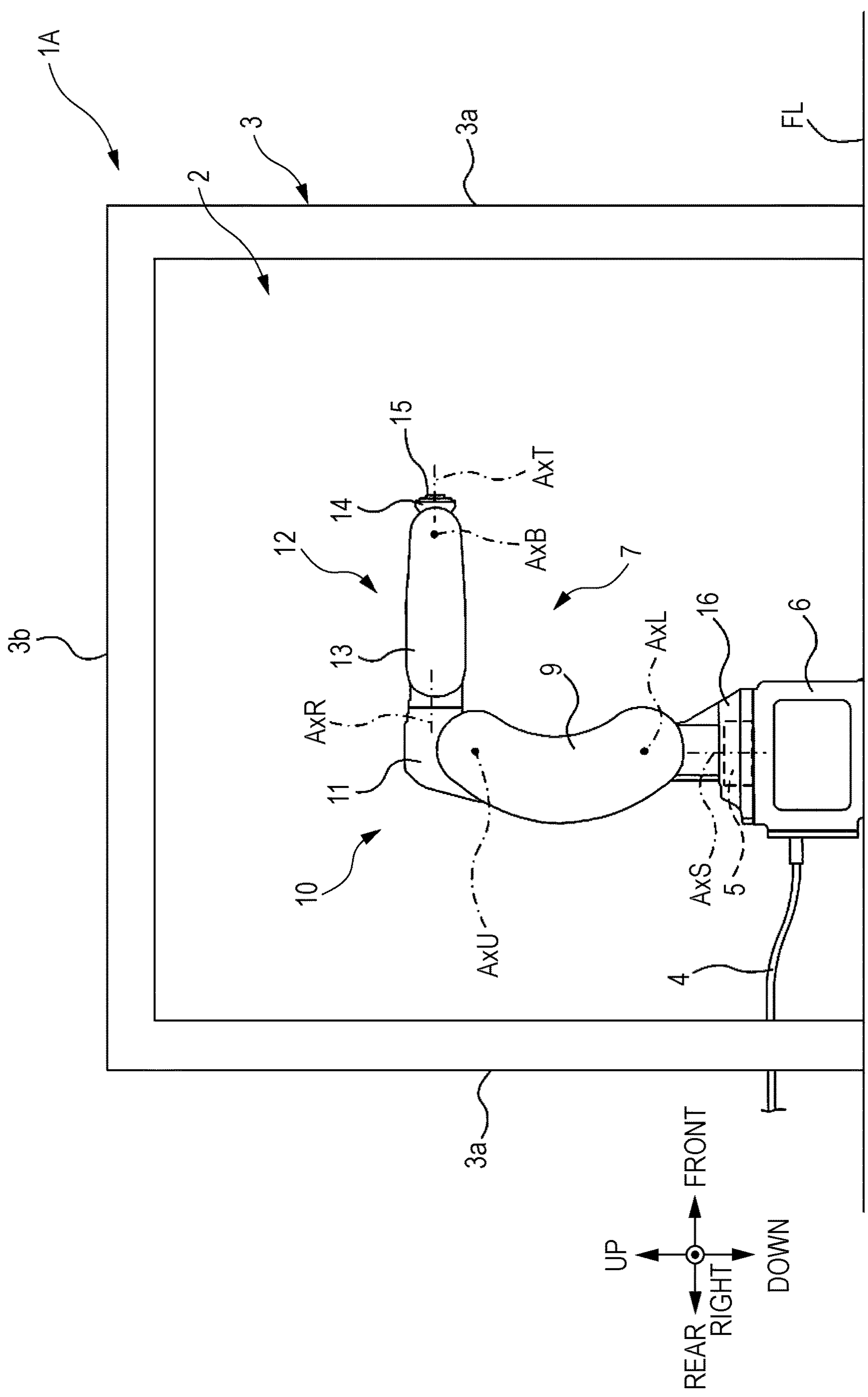
FIG. 8 is an explanatory view depicting an example of the entire configuration of a robot system where the robot is mounted on a floor surface of the paint booth.

For example, as in a robot system 1A illustrated in FIG. 8, the robot 10 may be mounted on the floor surface FL. Even in a case of mounting the robot 10 in such a position, the lubrication work is performed with the lubrication and drainage configuration of the reduction gear 5 illustrated in FIG. 3. Accordingly, an air layer of an appropriate volume can be ensured in the lubrication chamber 26.

Figure 9:
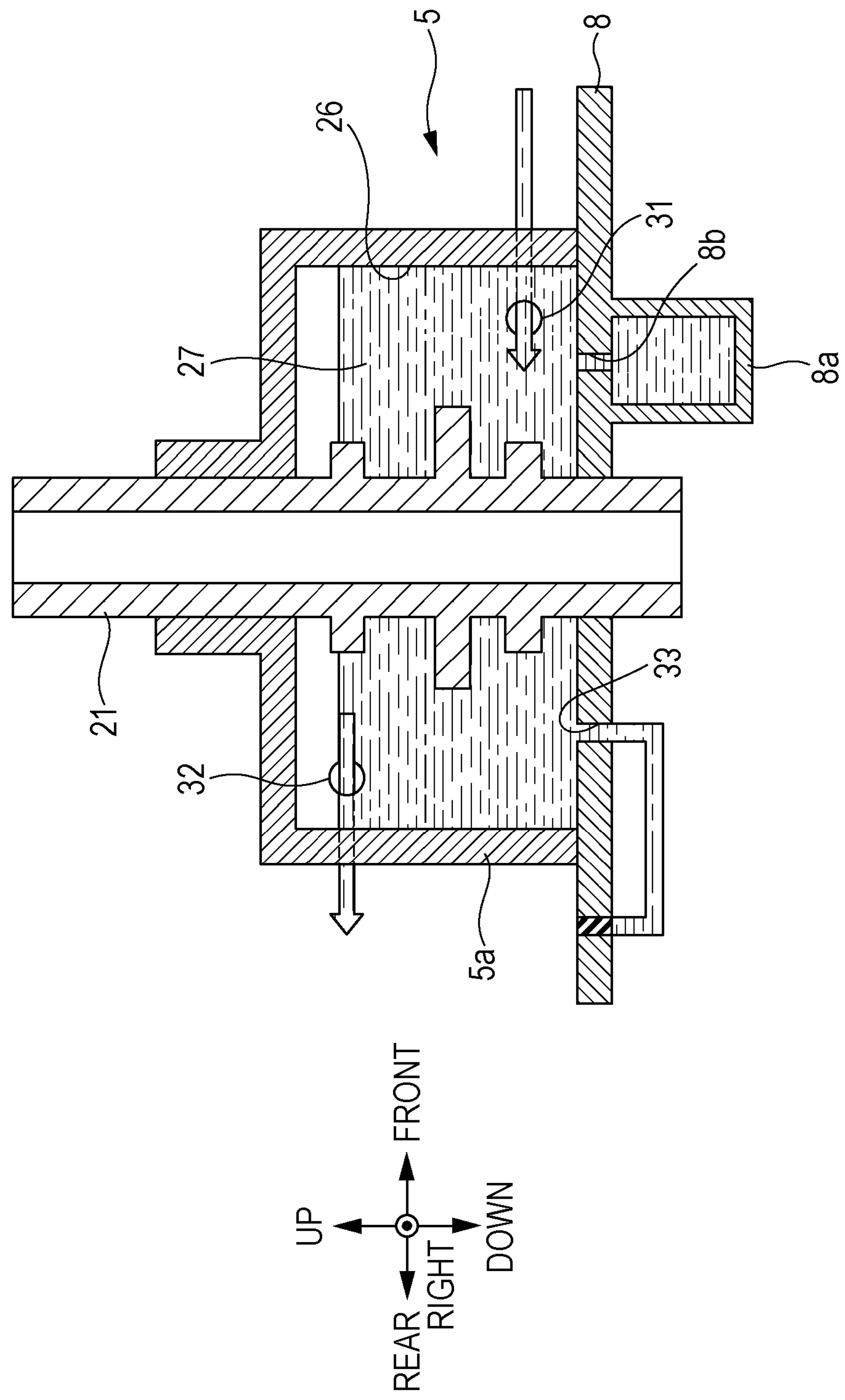
FIG. 9 is a cross-sectional view illustrating an example of the configuration of lubrication and drainage of the lubricant in the lubrication chamber along the axial direction of the S-axis.

In other words, in this mounting position, the lubrication port 31 is placed in a position higher than the end face drain port 33 and lower than the side surface drain port 32 as illustrated in FIG. 9. In this placement state, the end face drain port 33 is brought into the sealed closed state and the lubricant 27 is poured in through the lubrication port 31. Consequently, even if the amount of the lubricant 27 remaining in the lubrication chamber 26 in the state before lubrication is unknown, the lubricant 27 continues to be poured in until being drained through the side surface drain port 32. Consequently, the lubricant 27 can be filled in the lubrication chamber 26. In addition, an air layer can also be ensured in the internal space of the lubrication chamber 26 above the side surface drain port 32. In this case, it is conceivable that the lubricant 27 is filled in the communicating hole 8*b* and the air chamber 8*a* or that air existing in the air chamber 8*a* inhibits the lubricant 27 from entering the air chamber 8. In this state, the lubrication port 31 and the side surface drain port 32 are brought into the sealed closed state. Consequently, the lubrication work is completed. The position of the side surface drain port 32 in the S-axis AxS direction is appropriately set. Accordingly, an air layer of an appropriate volume (for example, approximately 12% or greater of the total internal volume including the air chamber 8*a*, the communicating hole 8*b*, and the lubrication chamber 26) can be ensured.

<6-2. Case Where Robot is Mounted on Side Wall>

Figure 10:
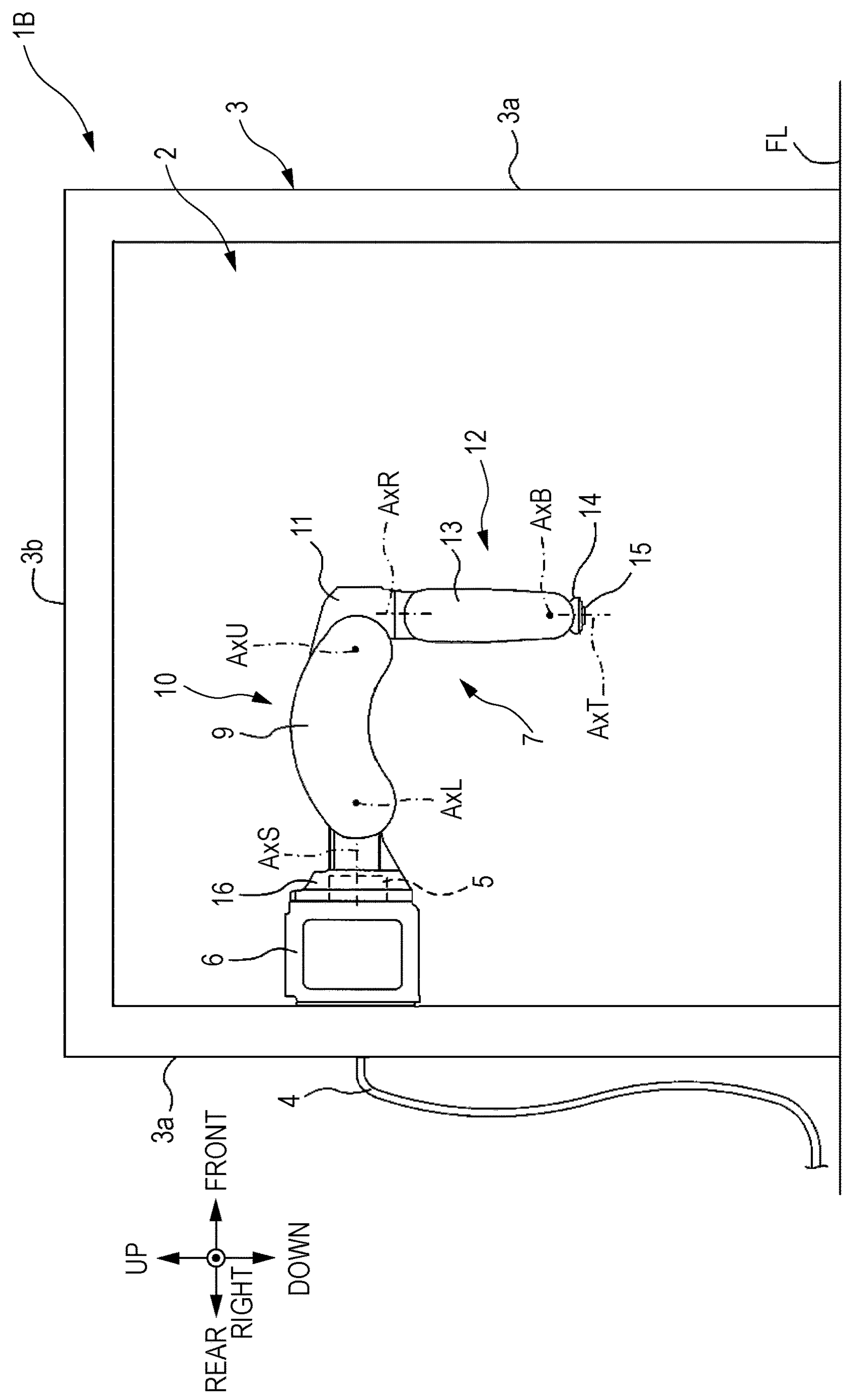
FIG. 10 is an explanatory view depicting an example of the entire configuration of a robot system including the robot mounted on a side wall of the paint booth.

Moreover, as in a robot system 1B illustrated in FIG. 10, the robot 10 may be mounted on the side wall 3*a*. Also in a case where the robot 10 is mounted in such a position, the lubrication work is performed with the lubrication and drainage configuration of the reduction gear 5 illustrated in FIG. 3. Accordingly, an air layer of an appropriate volume can be ensured in the lubrication chamber 26.

Figure 11:
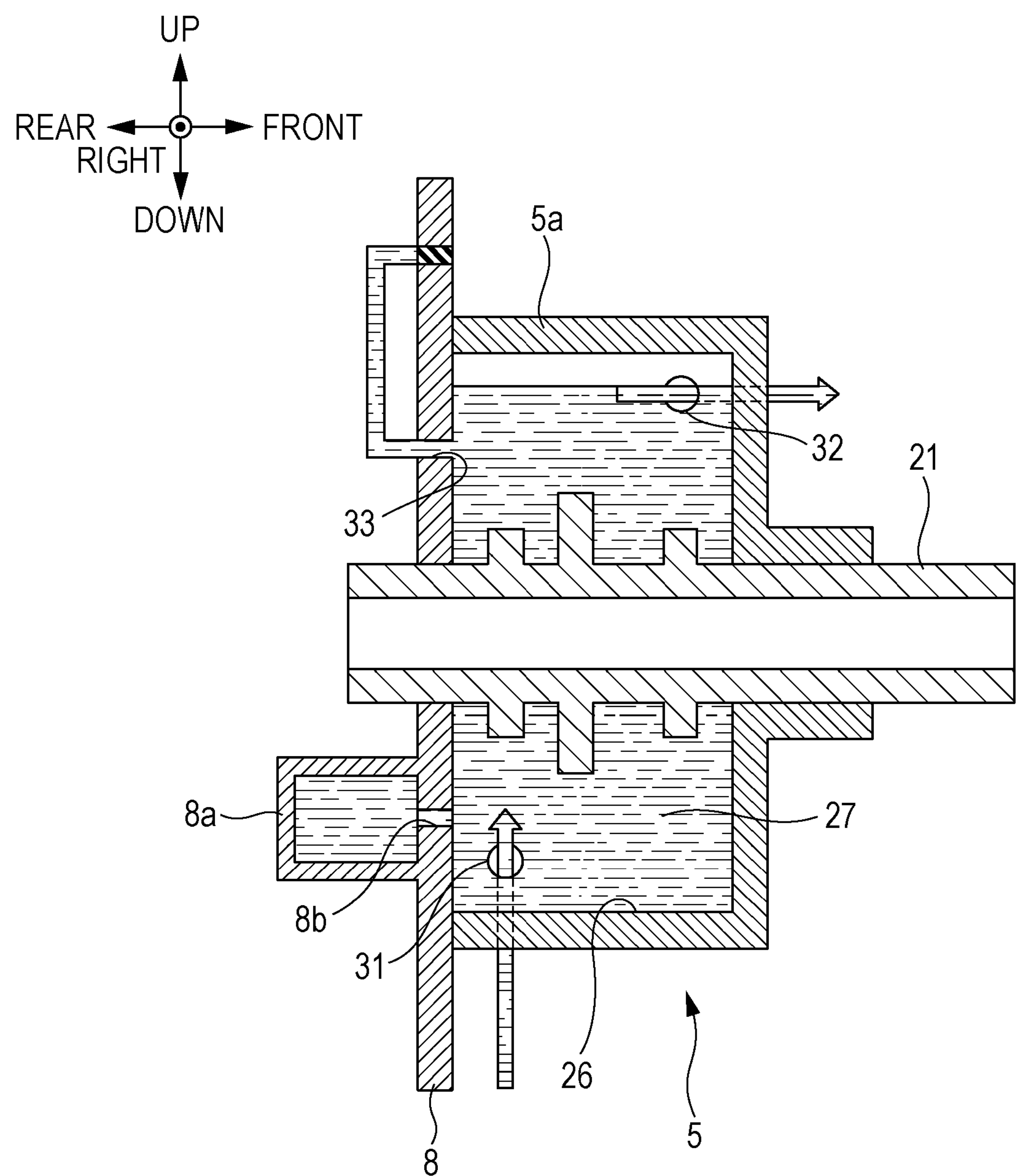
FIG. 11 is a cross-sectional view illustrating an example of the configuration of lubrication and drainage of the lubricant in the lubrication chamber along the axial direction of the S-axis.

In other words, as illustrated in FIG. 11, the reduction gear 5 is mounted in a position where the lubrication port 31 is placed in a position lower than the side surface drain port 32. The end face drain port 33 is brought into the sealed closed state and the lubricant 27 is poured in through the lubrication port 31. Also in this case, the lubricant 27 continues to be poured in until being drained through the side surface drain port 32. Accordingly, the lubricant 27 can be filled in the lubrication chamber 26, and an air layer can be ensured in the internal space of the lubrication chamber 26 above the side surface drain port 32. Also in this case, it is conceivable that the lubricant 27 is filled in the communicating hole 8*b* and the air chamber 8*a* or that the air existing in the air chamber 8*a* inhibits the lubricant 27 from entering the air chamber 8*a*. The position of the side surface drain port 32 is appropriately set. Accordingly, an air layer of an appropriate volume (for example, approximately 12% or greater of the total internal volume including the air chamber 8*a*, the communicating hole 8*b*, and the lubrication chamber 26) can be ensured.

As described above, the robot 10 included in the robot system 1 in the modifications is provided with the lubrication port 31 and the drain ports 32 and 33 for the lubricant 27 in the lubrication chamber 26 in such a manner as to form an air layer of a predetermined volume in the upper part of the internal space of the lubrication chamber 26 if the robot 10 is mounted on at least one of the floor surface FL and the side wall 3*a*.

Consequently, even if the robot 10 is mounted on the floor surface FL, the side wall 3*a*, or the ceiling wall 3*b*, an air layer of an appropriate volume can be ensured for the lubrication chamber 26 according to each position. Hence, the leak of the lubricant 27 of the reduction gear 5 can be reduced.

The mounting position of the robot 10 is basically required to locate the drain ports 32 and 33 that are used above the lubrication port 31. The height positions of the drain ports 32 and 33 in the lubrication chamber 26 determine the volume of an air layer that is formed.

Moreover, even if the robot 10 that performs work in a predetermined limited area (a work booth), such as a robot that performs painting work in the paint booth 2 being an explosion-proof area, can be operated even if the robot 10 is mounted on the floor surface FL, the side wall 3*a*, or the ceiling wall 3*b*. Hence, it is possible to make the effective use of space in the work booth.

The meanings of terms such as “perpendicular”, “orthogonal”, “parallel”, and “plane” in the above description should not be strictly interpreted. In other words, design and manufacturing tolerances and errors are permitted in these terms “perpendicular”, “orthogonal”, “parallel”, and “plane”. In other words, these terms indicate “substantially perpendicular”, “substantially orthogonal”, “substantially parallel”, and “substantially plane”.

Moreover, in the above description, the meanings of descriptions such as “identical”, “same”, “equal”, and “different” in dimension, size, shape, position, and the like in terms of the external appearance should not be strictly interpreted. In other words, design and manufacturing tolerances and errors are permitted in these expressions “identical”, “same”, “equal”, and “different”. In other words, these expressions indicate “substantially identical,” “substantially same,” “substantially equal”, and “substantially different.”

Moreover, in addition to the embodiment already described above, an embodiment obtained by combining the methods of the embodiment and the modifications as appropriate can also be used. In addition, although specific illustrations are not presented, the embodiment also includes embodiments and modifications, which can be obtained by making various changes to the embodiment and the modifications within the scope that does not depart from the gist thereof.

The robot of the present disclosure may be the following first to sixth robots.

The first robot is characterized by including: a housing including a plurality of joints; a reduction gear placed in the joint, the reduction gear housing a gear mechanism for slowing down and transmitting an output of a motor, the reduction gear including a lubrication chamber sealed to hold lubricant; and an air chamber placed inside the housing, the air chamber communicating with the lubrication chamber.

The second robot is the first robot characterized by further including: a base; and an arm configured to turn around the axis of rotation of the reduction gear with respect to the base, wherein the reduction gear is placed in the joint between the base and the arm, and the air chamber is placed inside the base.

The third robot is the second robot characterized by further including a cable introduced into the base penetrating through a hollow portion of the reduction gear and pulled toward one side, in a direction perpendicular to the axis of rotation, with respect to the axis of rotation, wherein the air chamber is placed on the other side, in the direction perpendicular to the axis of rotation, with respect to the axis of rotation in the base.

The fourth robot is the second or third robot characterized by further including a flange member fixed, along the direction of the rotation axis, to the reduction gear on one side and to the base on the other side, the flange member having a larger radial dimension with the rotation axis as the center than that of the reduction gear, wherein the air chamber is provided on a surface on the other side of the flange member.

The fifth robot is the fourth robot characterized in that the air chamber is integrally formed with the flange member.

The sixth robot is any of the first to fifth robots characterized in that the lubrication chamber is provided with an inlet and an outlet of the lubricant in such a manner as to form an air layer of a predetermined volume in an upper part of an internal space of the lubrication chamber upon the robot being mounted at least on a floor surface and wall surface, and the air chamber has an air layer of a predetermined volume formed above the lubrication chamber upon the robot being mounted on a ceiling surface.

The robot system of the present disclosure may be characterized by including: any of the first to sixth robots; and a work booth for the robot to perform predetermined work.

The foregoing detailed description has been presented for the purposes of illustration and description. Many modifications and variations are possible in light of the above teaching. It is not intended to be exhaustive or to limit the subject matter described herein to the precise fault disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot, comprising:

a base;

a reduction gear connected to the base and comprising a lubrication chamber and a gear mechanism positioned in the lubrication chamber;

an air chamber positioned inside the base and communicating with the lubrication chamber sealed to hold lubricant; and an arm connected to the reduction gear and configured to turn around a rotation axis of the reduction gear with respect to the base such that the reduction gear is positioned in a joint between the arm and the base; and a motor connected to the gear mechanism of the reduction gear and configured to generate driving force for turning the arm around the rotation axis of the reduction gear with respect to the base, wherein the gear mechanism in the reduction gear is configured to slow down and transmit an output of the motor such that the arm turns around the rotation axis of the reduction gear with respect to the base, and an outer frame of the base and the reduction gear includes a base casing, a flange member and a reduction gear casing such that the flange member is attached to the reduction gear casing on one side and to the base casing on the other side and that the air chamber is positioned in the base casing and outside the reduction gear casing.

2. The robot according to claim 1, further comprising:

a feed cable extending through a hollow portion of the reduction gear and into the base such that the feed cable extends in a first direction perpendicularly to the rotation axis of the reduction gear, wherein the air chamber is positioned in a second direction different from the first direction with respect to the rotation axis of the reduction gear.

3. The robot according to claim 1, wherein the flange member is fixed along a direction of the rotation axis of the reduction gear and to the reduction gear casing on one side and to the base casing on the other side, the flange member has a radial dimension with the rotation axis of the reduction gear as the center such that the radial dimension of the flange member is larger than a radial dimension of the reduction gear, and the air chamber is positioned on a surface of the flange member.

4. The robot according to claim 3, wherein the base and the reduction gear are formed such that the air chamber is integrally formed with the flange member.

5. The robot according to claim 3, wherein the base and the reduction gear are formed such that the air chamber is integrally formed with the flange member.

6. The robot according to claim 3, further comprising:

a feed cable extending through a hollow portion of the reduction gear and into the base such that the feed cable extends in a first direction perpendicularly to the rotation axis of the reduction gear, wherein the air chamber is positioned in a second direction different from the first direction with respect to the rotation axis of the reduction gear.

7. The robot according to claim 3, wherein the lubrication chamber has an inlet and an outlet formed for the lubricant such that an air layer is formed in an upper part of an internal space of the lubrication chamber when the robot is mounted on one of a floor surface and a wall surface and above the lubrication chamber when the robot is mounted on a ceiling surface.

8. The robot according to claim 1, wherein the lubrication chamber has an inlet and an outlet formed for the lubricant such that an air layer is formed in an upper part of an internal space of the lubrication chamber when the robot is mounted on one of a floor surface and a wall surface and above the lubrication chamber when the robot is mounted on a ceiling surface.

9. A robot system, comprising:

the robot of claim 1; and a work booth in which the robot performs predetermined work.

10. The robot according to claim 1, wherein the motor is positioned on the reduction gear.

11. The robot according to claim 1, further comprising:

a rotating head connected to the base and the arm and configured to rotate around the rotation axis of the reduction gear and rotate the arm around a rotation axis orthogonal to the rotation axis of the reduction gear.

12. The robot according to claim 1, wherein the reduction gear includes an output shaft connected to the gear mechanism and the arm such that the gear mechanism is configured to slow down and transmit an output of the motor to the output shaft such that the arm turns around the rotation axis of the reduction gear with respect to the base.

13. The robot according to claim 12, wherein the output shaft of the reduction gear has a hollow portion configured to accommodate a feed cable such that the feed cable extending through the hollow portion of the output shaft and into the base and that the feed cable extends in a first direction perpendicularly to the rotation axis of the reduction gear, and the air chamber is positioned in a second direction different from the first direction with respect to the rotation axis of the reduction gear.

14. A robot, comprising:

a base;

a reduction gear connected to the base and comprising a lubrication chamber and a gear mechanism positioned in the lubrication chamber;

an air chamber positioned inside the base and communicating with the lubrication chamber sealed to hold lubricant; and an arm connected to the reduction gear and configured to turn around a rotation axis of the reduction gear with respect to the base such that the reduction gear is positioned in a joint between the arm and the base; and a motor connected to the gear mechanism of the reduction gear and configured to generate driving force for turning the arm around the rotation axis of the reduction gear with respect to the base, wherein the gear mechanism in the reduction gear is configured to slow down and transmit an output of the motor such that the arm turns around the rotation axis of the reduction gear with respect to the base, and an outer frame of the base and the reduction gear includes a base casing, a flange member and a reduction gear casing such that the flange member is fixed to the reduction gear casing on one side and to the base casing on the other side, the air chamber is positioned in the base casing and outside the reduction gear casing, and the air chamber is positioned on a surface of the flange member.

15. The robot according to claim 1, wherein the flange member is fixed to the reduction gear casing on one side and to the base casing on the other side, and the flange member has a radial dimension with the rotation axis of the reduction gear as the center such that the radial dimension of the flange member is larger than a radial dimension of the reduction gear.

16. The robot according to claim 14, wherein the base and the reduction gear are formed such that the air chamber is integrally formed with the flange member.

17. The robot according to claim 14, further comprising:

a feed cable extending through a hollow portion of the reduction gear and into the base such that the feed cable extends in a first direction perpendicularly to the rotation axis of the reduction gear, wherein the air chamber is positioned in a second direction different from the first direction with respect to the rotation axis of the reduction gear.

18. The robot according to claim 14, wherein the lubrication chamber has an inlet and an outlet formed for the lubricant such that an air layer is formed in an upper part of an internal space of the lubrication chamber when the robot is mounted on one of a floor surface and a wall surface and above the lubrication chamber when the robot is mounted on a ceiling surface.

19. The robot according to claim 14, wherein the motor is positioned on a surface of the reduction gear casing in the outer frame of the base and reduction gear.

20. The robot according to claim 14, further comprising:

a rotating head connected to the base and the arm and configured to rotate around the rotation axis of the reduction gear and rotate the arm around a rotation axis orthogonal to the rotation axis of the reduction gear.

* * * * *